United States Patent
Nishio et al.

(10) Patent No.: US 7,352,397 B2
(45) Date of Patent: Apr. 1, 2008

(54) CIRCUIT AND METHOD FOR CONTOUR ENHANCEMENT

(75) Inventors: Shigeru Nishio, Kawasaki (JP); Hiroshi Daiku, Kawasaki (JP); Asao Kokubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 802 days.

(21) Appl. No.: 10/626,726

(22) Filed: Jul. 25, 2003

(65) Prior Publication Data

US 2004/0119859 A1    Jun. 24, 2004

(30) Foreign Application Priority Data

Jul. 25, 2002   (JP)   ............................. 2002-216848
Oct. 30, 2002   (JP)   ............................. 2002-316078

(51) Int. Cl.
   H04N 5/208   (2006.01)
   H04N 5/228   (2006.01)
   H04N 5/217   (2006.01)
   H04N 5/21    (2006.01)
   G06K 9/40    (2006.01)
   G06K 15/00   (2006.01)

(52) U.S. Cl. .................. 348/252; 348/241; 348/222.1; 348/625; 382/266; 358/3.27

(58) Field of Classification Search ................ 348/252, 348/241; 358/3.27
   See application file for complete search history.

(56) References Cited

U.S. PATENT DOCUMENTS

| 4,817,174 | A | * | 3/1989 | Nakatani | ..................... 382/266 |
| 5,331,411 | A | * | 7/1994 | Kawakami et al. | ....... 348/222.1 |
| 6,677,994 | B1 | * | 1/2004 | Kobayashi | ................... 348/252 |
| 6,909,813 | B2 | * | 6/2005 | Amano et al. | .............. 382/266 |
| 6,915,023 | B2 | * | 7/2005 | Hamada et al. | ............. 382/266 |

FOREIGN PATENT DOCUMENTS

| JP | 05022601 A | 1/1993 |
| JP | 10-240929 A | 9/1998 |
| JP | 10-257352 A | 9/1998 |
| JP | 11-017954 A | 1/1999 |
| JP | 2000-350055 A | 12/2000 |
| JP | 2001-157085 A | 6/2001 |
| JP | 2001-292325 A | 10/2001 |
| JP | 2002-112108 A | 4/2002 |

* cited by examiner

*Primary Examiner*—Nhan T. Tran
(74) *Attorney, Agent, or Firm*—Arent Fox LLP

(57) ABSTRACT

A semiconductor integrated circuit includes a differential calculating unit which obtains a differential between a value of a pixel of interest and values of surrounding pixels contained in an image signal supplied from an image sensor, a dead-zone generating unit which defines a predetermined range of pixel values, and a comparison unit which checks whether the differential falls outside the predetermined range, wherein contour enhancement is applied to the pixel of interest in response to a determination by the comparison unit that the differential falls outside the predetermined range.

7 Claims, 4 Drawing Sheets

CIRCUIT AND METHOD FOR CONTOUR ENHANCEMENT

CROSS-REFERENCE TO RELATED APPLICATIONS

The present application is based upon and claims the benefit of priority from the prior Japanese Patent Application No. 2002-216848 filed on Jul. 25, 2002, and Japanese priority application No. 2002-316078 filed on Oct. 30, 2002, with the Japanese Patent Office, the entire contents of which are incorporated herein by reference.

BACKGROUND OF THE INVENTION

1. Field of the Invention

The present invention generally relates to semiconductor integrated circuits and methods for image processing, and particularly relates to a semiconductor integrated circuit and a method for enhancing contours in image signals supplied from an image sensor.

2. Description of the Related Art

A CMOS image sensor includes a reception section in which a plurality of photo-diodes are arranged in a matrix array. These photo-diodes each correspond to a pixel of a captured image. Incident light is subjected to photoelectric conversion on a pixel-by-pixel basis, and the electric charge obtained by the photoelectric conversion is accumulated in an electric charge accumulation section for reading of data. Data of each pixel is supplied to a processing circuit such as an image processor for such processing as RGB conversion, contour enhancement, and format conversion, followed by being supplied to a memory or to an image display apparatus or the like.

In order to enhance image contours, conventionally, uniform image enhancement is applied unvaryingly to all the pixels of an image. Namely, differences of image data levels with adjacent pixels are obtained with respect to every pixel of the image, and these differences are enlarged by a predetermined factor so as to enlarge differences of image data levels between adjacent pixels.

A Japanese Patent Application Publication No. 5-22601 discloses a process that avoids an artifact of multiple contours without degrading the performance of contour enhancement. This process obtains a first-order derivation by calculating differentials in a predetermined direction while providing a dead zone in which no processing is performed, and further obtains a second-order derivation in this predetermined direction, followed by performing an averaging process to generate an edge-enhanced signal.

When all the pixels of image data are subjected to image enhancement, however, image noise is enhanced altogether, resulting in undesirable degradation of image quality.

Accordingly, there is a need for a method and a circuit for contour enhancement that can easily generate contour-enhanced images without degrading image quality.

SUMMARY OF THE INVENTION

It is a general object of the present invention to provide a method and a circuit for contour enhancement that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a method and a circuit for contour enhancement particularly pointed out in the specification in such full, clear, concise, and exact terms as to enable a person having ordinary skill in the art to practice the invention.

To achieve these and other advantages in accordance with the purpose of the invention, the invention provides a semiconductor integrated circuit, including a differential calculating unit which obtains a differential between a value of a pixel of interest and values of surrounding pixels contained in an image signal supplied from an image sensor, a dead-zone generating unit which defines a predetermined range of pixel values, and a comparison unit which checks whether the differential falls outside the predetermined range, wherein contour enhancement is applied to the pixel of interest in response to a determination by the comparison unit that the differential falls outside the predetermined range.

In the semiconductor integrated circuit as described above, contour enhancement is not unvaryingly applied to the entirety of the image data, but is applied to only those image portions which are identified as requiring contour enhancement. This achieves efficient contour enhancement that avoids unnecessary enhancement of noise.

The calculation of the differential and the contour enhancement may be performed only with respect to the green-color component among a plurality of color components or only with respect to the luminance component. With this provision, a line-delay memory needs to be provided only for the green-color component or the luminance component, thereby achieving a relatively small circuit size.

Further, a method of enhancing contours includes the steps of obtaining a differential between a value of a pixel of interest and values of surrounding pixels contained in an image signal supplied from an image sensor, defining a predetermined range of pixel values, checking whether the differential falls outside the predetermined range, and applying contour enhancement to the pixel of interest in response to a determination that the differential falls outside the predetermined range.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
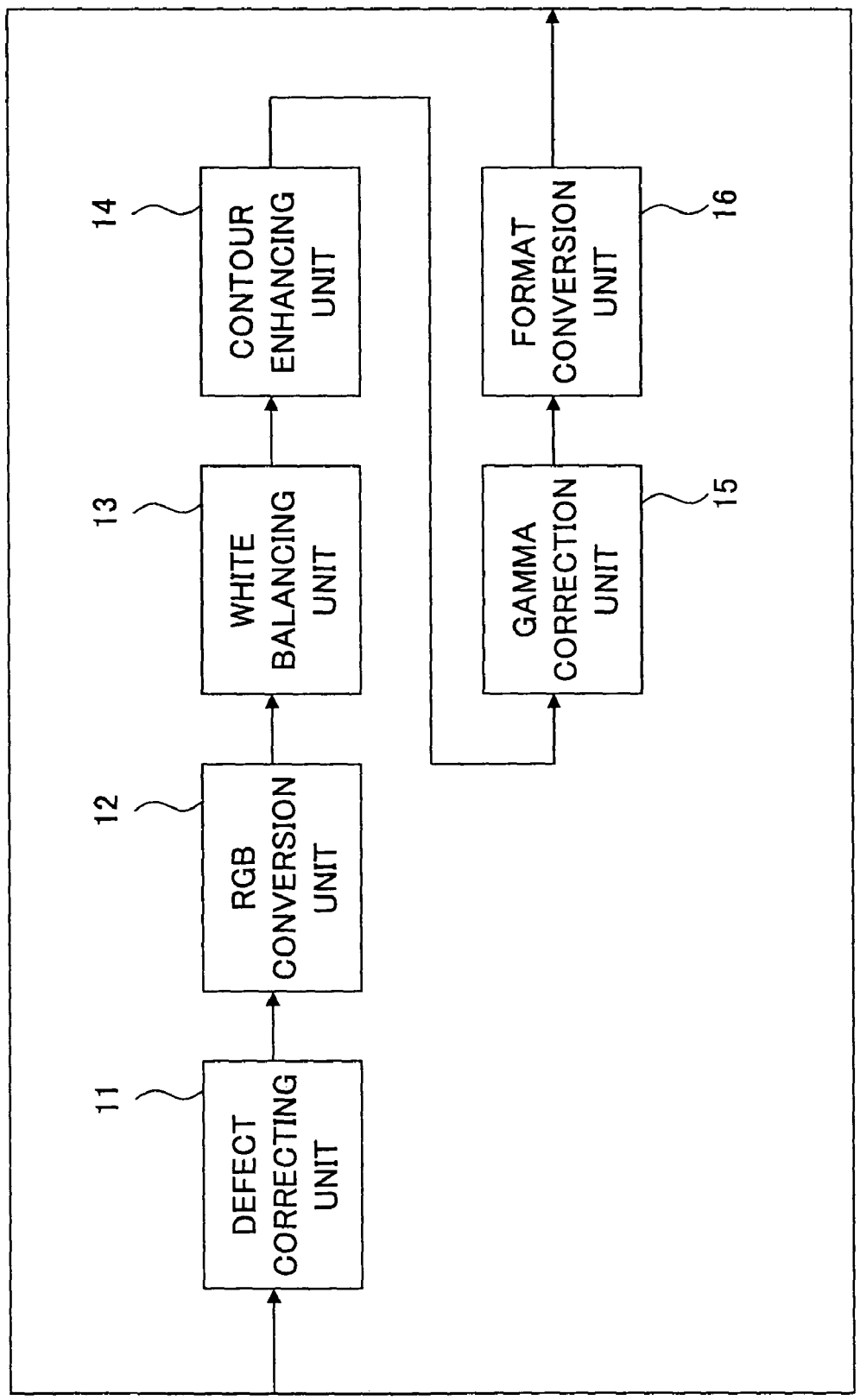
FIG. 1 is a block diagram of an image processor for performing image processing including contour enhancement according to the present invention.

FIG. 1 is a block diagram of an image processor for performing image processing including contour enhancement according to the present invention.

The image processor of FIG.1 is implemented as an LSI chip, and includes a defect correcting unit 11, a RGB conversion unit 12, a white balancing unit 13, a contour enhancing unit 14, a gamma correction unit 15, and a format conversion unit 16.

The defect correcting unit 11 receives image signals from an image sensor such as a CCD (charge coupled device), and carries out defect correction. An image sensor inevitably includes pixels that are defective and thus cannot properly operate. Such pixels appear as fixed black dots or white dots. The defect correcting unit 11 is provided for the purpose of correcting image data of these defective pixels. The image signals having undergone the defective pixel correction are supplied from the defect correcting unit 11 to the RGB conversion unit 12. The RGB conversion unit 12 outputs image signals by obtaining color data of each pixel based on color information of the RGB Bayer array. The image signals output from the RGB conversion unit 12 are then subjected to white balancing by the white balancing unit 13.

After this, the contour enhancing unit 14 for performing contour enhancement of the present invention carries out a process for enhancing contours of the supplied image data. The gamma correction unit 15 applies a process for correcting gamma characteristics of the output apparatus. Finally, the format conversion unit 16 converts the image signals into a format acceptable to a subsequent processing stage, and the converted image signals are output.

Figure 2:
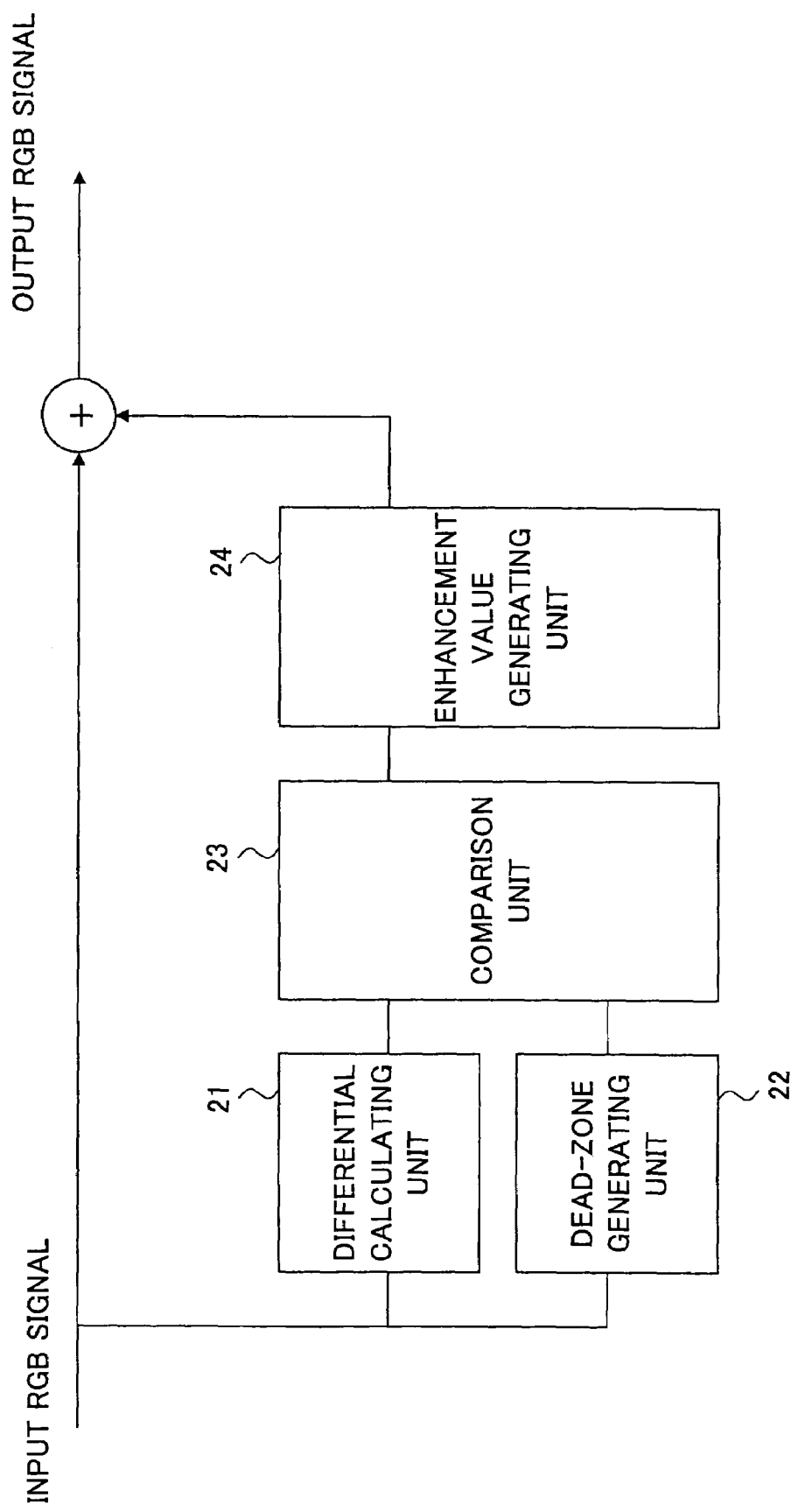
FIG. 2 is a block diagram of a contour enhancing unit according to a first embodiment of the present invention.

FIG. 2 is a block diagram of the contour enhancing unit 14 according to a first embodiment of the present invention.

The contour enhancing unit 14 of FIG. 2 includes a differential calculating unit 21, a dead-zone generating unit 22, a comparison unit 23, and an enhancement value generating unit 24. The differential calculating unit 21 obtains differentials of pixel values between a pixel of interest and surrounding pixels. The dead-zone generating unit 22 obtains a predetermined range of pixels that is defined by an upper limit and a lower limit. The comparison unit 23 checks whether the differentials supplied from the differential calculating unit 21 fall into the predetermined range indicated by the dead-zone generating unit 22. The enhancement value generating unit 24 generates a correction value (enhancement value) for correcting the value of the pixel of interest for the purpose of contour enhancement in response to a determination that the differentials between the pixel of interest and the surrounding pixels do not fall within the predetermined range. The generated correction value is added to the pixel value of the input RGB signals.

Figure 3:
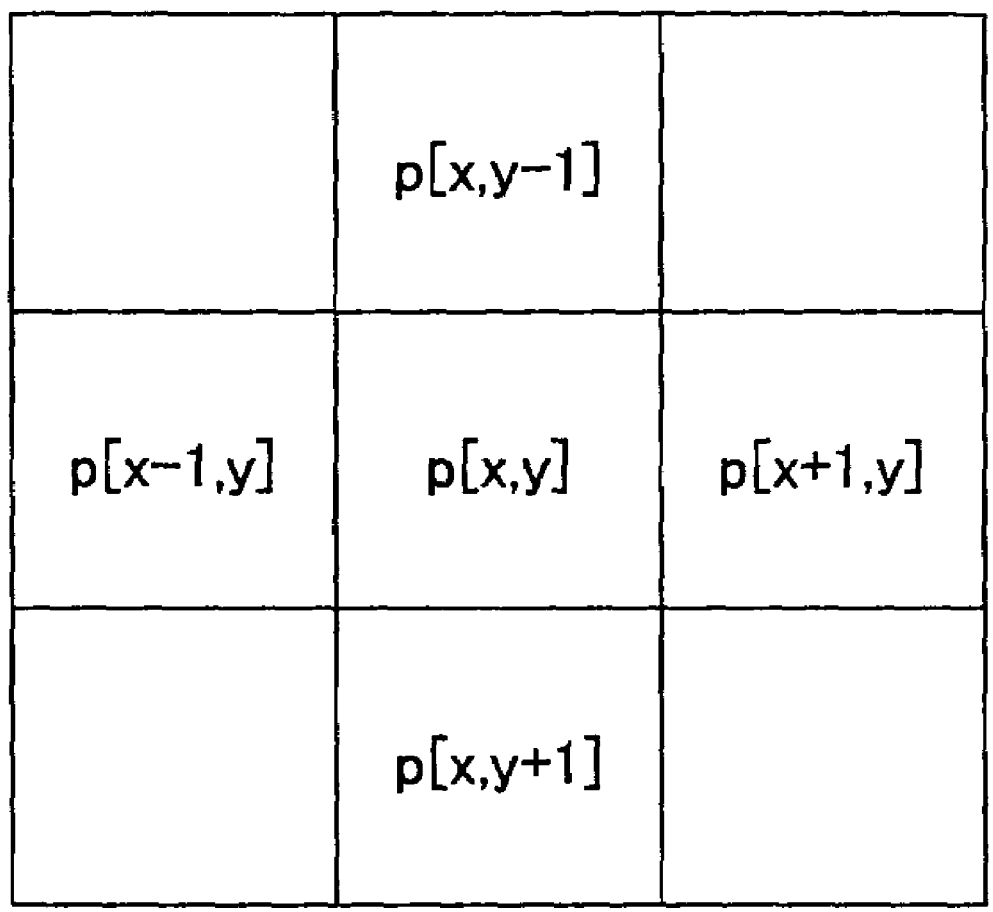
FIG. 3 is an illustrative drawing for explaining the pixel of interest subjected to contour enhancement.

FIG. 3 is an illustrative drawing for explaining the pixel of interest subjected to contour enhancement.

In the typical output of an image sensor, each pixel does not have the data indicative of three R, G, and B colors. Rather, each pixel represents one pre-assigned color among the RGB colors such as in the RGB Bayer array. Based on the RGB Bayer array, the RGB conversion unit 12 performs a process for assigning the three RGB colors to each pixel. Accordingly, the image data subjected to contour enhancement by the contour enhancing unit 14 has all the three RGB colors already assigned to each pixel.

In the present invention, a pixel of interest p[x, y] is given, and the four neighboring pixels p[x, y−1], p[x−1, y], p[x+1, y], and p[x, y+1] are taken into consideration to perform contour enhancement in respect of the pixel of interest.

Further, the present invention does not perform uniform contour enhancement unvaryingly over the entirety of image data, but carries out contour enhancement only on image portions that are identified as needing contour enhancement according to the determination by the comparison unit 23. Here, the RGB colors and a luminance component Y are related as:

$$Y = 0.299 \times R + 0.587 \times G + 0.114 \times B. \quad (1)$$

As is shown in this equation, the G component, among the three colors, contains almost 60% of the total luminance component. When a decision has to be made as to whether contour enhancement needs to be applied, therefore, only the G component may be referred to, thereby achieving an efficient check.

In the first embodiment of contour enhancement, the G component is utilized to determine whether contour enhancement needs to be applied to a pixel of interest.

In respect of G[x, y] of a pixel of interest, a difference between this G component and an average of G components of the surrounding pixels is computed. A check is then made as to whether the following condition is satisfied.

$$\text{low\_limit} < (G[x-1,y] + G[x+1,y] + G[x,y-1] + G[x,y+1])/4 - G[x,y] < \text{max\_limit} \quad (2)$$

Here, the lower limit low_limit and the upper limit $\max_{13}$ limit are generated by the dead-zone generating unit 22. The differential calculating unit 21 generates the difference between the G component of the pixel of interest and the average of G components of the surrounding pixels for comparison with the upper and lower limits. The comparison unit 23 determines whether the condition (2) is satisfied. The lower limit low_limit and the upper limit upper_limit may be obtained by use of the values of the surrounding pixels as follows $$\text{low\_limit} = L\_\text{limit} \times \text{pixel\_value} + L\_\text{offset}$$

$$\text{max\_limit} = M\_\text{limit} \times \text{pixel\_value} - M\_\text{offset}$$

Here, pixel_value may be an average or median of the values of predetermined surrounding pixels. L_limit and L_offset are the values for defining the lower limit of the dead zone. M_limit and M_offset are the values for defining the upper limit of the dead zone. L_limit and M_limit may be the same value, or may be set to different values. L_offset and M_offset may be the same value, or may be set to different values.

When the condition (2) is satisfied, it is decided that contour enhancement is not performed. The enhancement value generating unit 24 does not generate a correction value (enhancement value) in this case. As a result, the pixel of interest of the input signals will have the same R, G, and B color values as before, i.e., $$R[x,y] = R[x,y]$$

$$G[x,y] = G[x,y]$$

$$B[x,y] = B[x,y].$$

When the condition (2) is not satisfied, i.e., when the difference between the G component of the pixel of interest and the average of G components of the surrounding pixels falls within the range defined by the upper and lower limits, the enhancement value generating unit 24 generates a correction value (enhancement value). The correction value is then added to (or rather "subtracted from" as a form of expression) each of the R, G, and B colors of the pixel of interest of the input signals.

$$R[x,y] = R[x,y] - R\text{gain} \times ((G[x-1,y] + G[x+1,y] + G[x,y-1] + G[x,y+1])/4 - G[x,y])$$

$$G[x,y]=G[x,y]-G\text{gain}\times((G[x-1,y]+G[x+1,y]+G[x,y-1]+G[x,y+1])/4-G[x,y])$$

$$B[x,y]=B[x,y]-B\text{gain}\times((G[x-1,y]+G[x+1,y]+G[x,y-1]+G[x,y+1])/4-G[x,y])$$

Here, the second term on the right-hand side of each equation is the correction value (enhancement value). Rgain, Ggain, and Bgain are gain factors for defining the degree of contour enhancement with respect to R, G, and B, respectively. It suffices to have the gain factors that are more than zero, and the gain factors may be set to 3.0, for example.

In the process as described above, a correction value that is obtained from the G components of the pixel of interest and the surrounding pixels is applied to another color (e.g., the R color) of the pixel of interest for the purpose of enhancing contours of this color (i.e., the R color). It is conceivable that a correction value obtained from R components of the pixel of interest and the surrounding pixels is used in contour enhancement of the R color. In order to achieve this, however, a memory such as a FIFO memory for 2-line delay needs to be provided for every single color, resulting in the circuit size of the differential calculating unit 21 being expanded. In the embodiment described above, correction values for contour enhancement are limited to only the G component, so that the line memory needs to be provided only for the G component. This configuration requires a relatively small circuit size.

In the embodiment as described above, contour enhancement is not unvaryingly applied to the entirety of the image data, but is applied to only those image portions which are identified as requiring contour enhancement. This achieves efficient contour enhancement that avoids unnecessary enhancement of noise.

In the following, a variation of the first embodiment of the present invention will be described.

The differential calculating unit 21 calculates differentials between the G component of the pixel of interest and the G components of the surrounding pixels as follows.

$$\text{diff}\_1=G[x-1,y]-G[x,y]$$

$$\text{diff}\_2=G[x+1,y]-G[x,y]$$

$$\text{diff}\_3=G[x,y-1]-G[x,y]$$

$$\text{diff}\_4=G[x,y+1]-G[x,y]$$

Then, low_limit and max_limit are generated by the dead-zone generating unit 22 for comparison by the comparison unit 23 as follows.

$$\text{low\_limit}<\text{diff}\_1<\text{max}\_{limit} \quad (3)$$

$$\text{low\_limit}<\text{diff}\_2<\text{max}\_{limit} \quad (4)$$

$$\text{low\_limit}<\text{diff}\_3<\text{max}\_{limit} \quad (5)$$

$$\text{low\_limit}<\text{diff}\_4<\text{max}\_{limit} \quad (6)$$

Contour enhancement is not performed if all the conditions (3) through (6) are satisfied. In this case, the enhancement value generating unit 24 does not generate a correction value (enhancement value). The values of the pixel of interest of input signals will thus stay the same with respect to each of R, G, and B, i.e., $$R[x,y]=R[x,y]$$

$$G[x,y]=G[x,y]$$

$$B[x,y]=B[x,y].$$

Further, contour enhancement is not performed either if the largest one of diff_1 through diff_4 has an absolute value identical to that of the smallest one of diff_1 through diff_4. This condition corresponds to a border case that comes between a case in which the value of the pixel of interest should be increased and a case in which the value of the pixel of interest should be decreased. Because of this, no correction is made to the pixel of interest.

If one of the conditions (3) through (6) is not satisfied, diff_max is identified as having the largest absolute value among diff_1 through diff_4, and the enhancement value generating unit 24 generates a correction value (enhancement value) as follows. The generated correction value is then added to (or rather "subtracted from" as a form of expression) each of the R, G, and B colors of the pixel of interest of the input signals.

$$R[x,y]=R[x,y]-R\text{gain}\times\text{diff\_max}$$

$$G[x,y]=G[x,y]-G\text{gain}\times\text{diff\_max}$$

$$B[x,y]=B[x,y]-B\text{gain}\times\text{diff\_max}$$

Here, the second term on the right-hand side of each equation is the correction value (enhancement value). Rgain, Ggain, and Bgain are gain factors for defining the degree of contour enhancement with respect to R, G, and B, respectively. It suffices to have the gain factors that are more than zero, and the gain factors may be set to 0.8, for example.

In the variation of the first embodiment described above, a line-delay memory should be provided only for the G component in the same manner as in the first embodiment, thereby achieving a relatively small circuit size. Further, contour enhancement is not unvaryingly applied to the entirety of the image data, but is applied to only those image portions which are identified as requiring contour enhancement. This achieves efficient contour enhancement that avoids unnecessary enhancement of noise. In comparison with the first embodiment, an effect of contour enhancement will be larger since the differential having the largest absolute value among diff_1 through diff_4 is selected for use in generating the correction value (enhancement value). At a slope where the image level changes monotonously, the first embodiment tends to generate a small correction value (enhancement value). On the other hand, the variation of the first embodiment can guarantee a relatively large correction value (enhancement value), thereby producing a sufficient contour enhancement effect.

Figure 4:
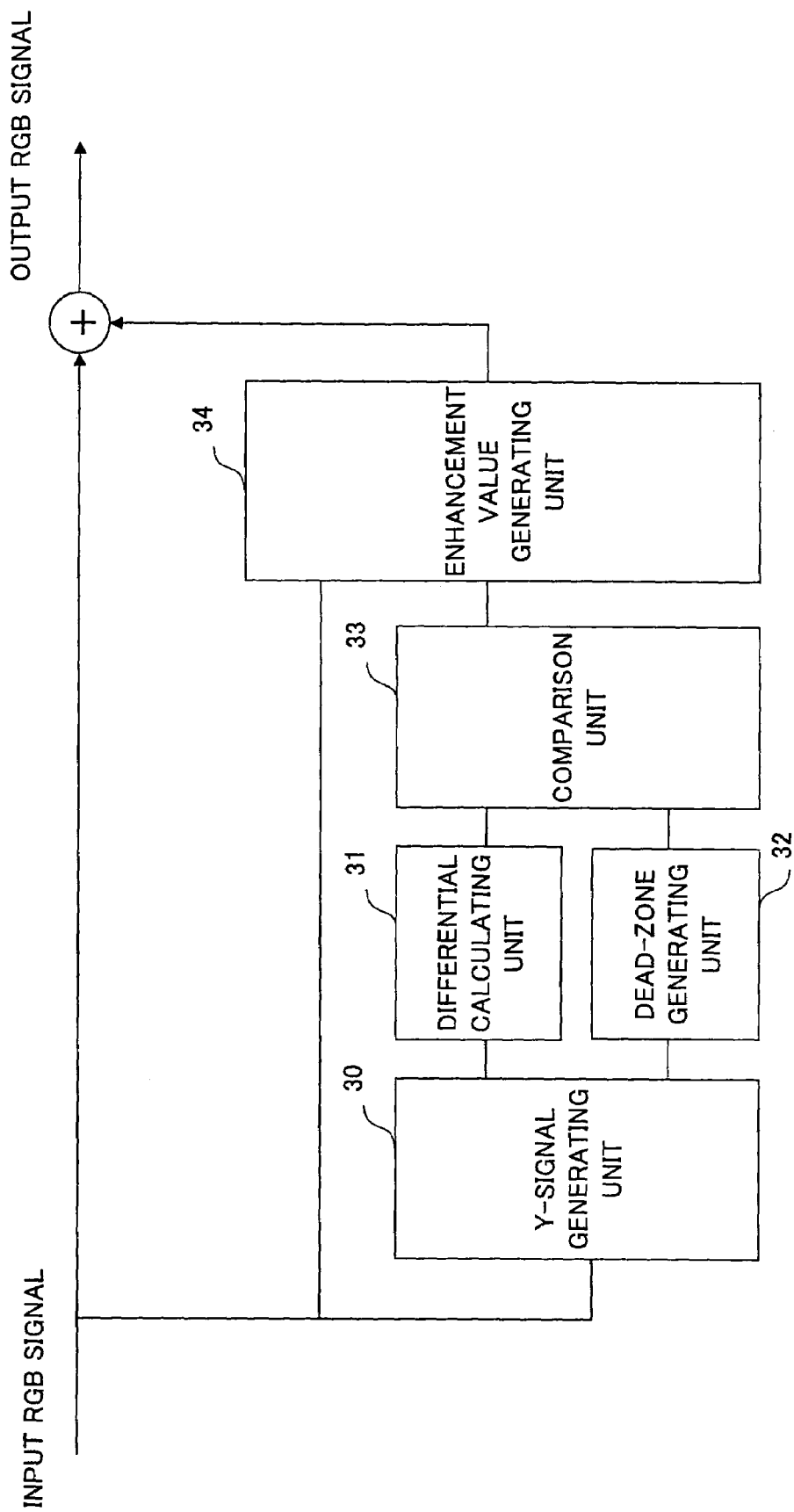
FIG. 4 is a block diagram of the contour enhancing unit according to a second embodiment of the present invention.

FIG. 4 is a block diagram of the contour enhancing unit 14 according to a second embodiment of the present invention.

The contour enhancing unit 14 of FIG. 4 includes a Y-signal generating unit 30, a differential calculating unit 31, a dead-zone generating unit 32, a comparison unit 33, and an enhancement value generating unit 34. The Y-signal generating unit 30 generates a luminance signal Y from the input RGB signals based on the equation (1) previously presented. In the second embodiment, contour enhancement is performed by use of the luminance component Y in place of the G component.

The differential calculating unit 31 obtains differentials of pixel values between a pixel of interest and surrounding pixels. The dead-zone generating unit 32 obtains a predetermined range of pixels that is defined by an upper limit and a lower limit. The comparison unit 33 checks whether the differentials supplied from the differential calculating unit 31 fall into the predetermined range indicated by the dead-zone generating unit 32. The enhancement value generating unit 34 generates a correction value (enhancement value) for correcting the value of the pixel of interest for the purpose of contour enhancement in response to a determination that the differentials between the pixel of interest and the surrounding pixels do not fall within the predetermined range. The generated correction value is added to the pixel value of the input RGB signals.

In respect of a Y component Y[x, y] of a pixel of interest, a difference between this Y component and an average of Y components of the surrounding pixels is computed. A check is then made as to whether the following condition is satisfied.

$$\text{low\_limit} < (Y[x-1,y]+Y[x+1,y]+Y[x,y-1]+Y[x,y+1])/4 - Y[x,y] < max_{13} \text{ limit} \quad (7)$$

Here, the lower limit low_limit and the upper limit max_limit are generated by the dead-zone generating unit 32 based on the Y components of neighboring pixels. The differential calculating unit 31 generates the difference between the Y component of the pixel of interest and the average of Y components of the surrounding pixels for comparison with the upper and lower limits. The comparison unit 33 determines whether the condition (7) is satisfied.

When the condition (7) is satisfied, it is decided that contour enhancement is not performed. The enhancement value generating unit 34 does not generate a correction value (enhancement value) in this case. As a result, the pixel of interest of the input signals will have the same R, G, and B color values as before, i.e., $$R[x,y]=R[x,y]$$

$$G[x,y]=G[x,y]$$

$$B[x,y]=B[x,y].$$

When the condition (7) is not satisfied, i.e., when the difference between the Y component of the pixel of interest and the average of Y components of the surrounding pixels falls within the range defined by the upper and lower limits, the enhancement value generating unit 34 generates a correction value (enhancement value). The correction value is then added to (or rather "subtracted from" as a form of expression) each of the R, G, and B colors of the pixel of interest of the input signals.

$$R[x,y]=R[x,y]-R\text{gain}\times((G[x-1,y]+G[x+1,y]+G[x,y-1]+G[x,y+1])/4-G[x,y])$$

$$G[x,y]=G[x,y]-G\text{gain}\times((G[x-1,y]+G[x+1,y]+G[x,y-1]+G[x,y+1])/4-G[x,y])$$

$$B[x,y]=B[x,y]-B\text{gain}\times((G[x-1,y]+G[x+1,y]+G[x,y-1]+G[x,y+1])/4-G[x,y])$$

Here, the second term on the right-hand side of each equation is the correction value (enhancement value). Rgain, Ggain, and Bgain are gain factors for defining the degree of contour enhancement with respect to R, G, and B, respectively. It suffices to have the gain factors that are more than zero.

In the process as described above, a correction value that is obtained from the Y components of the pixel of interest and the surrounding pixels is applied to a given color (e.g., the R color) of the pixel of interest for the purpose of enhancing contours of this color (i.e., the R color). With only the Y component being used in generating the correction value for contour enhancement, the line delay memory needs to be provided only for the Y component in the differential calculating unit 31. This configuration requires a relatively small circuit size.

In the embodiment as described above, contour enhancement is not unvaryingly applied to the entirety of the image data, but is applied to only those image portions which are identified as requiring contour enhancement. This achieves efficient contour enhancement that avoids unnecessary enhancement of noise. Further, this embodiment achieves contour enhancement using accurate luminance information by use of a circuit having a relatively small size.

In the following, a variation of the second embodiment of the present invention will be described.

The differential calculating unit 31 calculates differentials between the Y component of the pixel of interest and the Y components of the surrounding pixels as follows.

$$\text{diff\_1}=Y[x-1, y]-Y[x, y]$$

$$\text{diff\_2}=Y[x+1, y]-Y[x, y]$$

$$\text{diff\_3}=Y[x, y-1]-Y[x, y]$$

$$\text{diff\_4}=Y[x, y+1]-Y[x, y]$$

Then, low_limit and max_limit are generated by the dead-zone generating unit 32 for comparison by the comparison unit 33 as follows.

$$\text{low\_limit}<\text{diffy\_1}<\text{max\_limit} \quad (8)$$

$$\text{low\_limit}<\text{diffy\_2}<\text{max\_limit} \quad (9)$$

$$\text{low\_limit}<\text{diffy\_3}<\text{max\_limit} \quad (10)$$

$$\text{low\_limit}<\text{diffy\_4}<\text{max\_limit} \quad (11)$$

Contour enhancement is not performed if all the conditions (8) through (11) are satisfied. In this case, the enhancement value generating unit 34 does not generate a correction value (enhancement value). The values of the pixel of interest of input signals will thus stay the same with respect to each of R, G, and B, i.e., $$R[x,y]=R[x,y]$$

$$G[x,y]=G[x,y]$$

$$B[x,y]=B[x,y].$$

Further, contour enhancement is not performed either if the largest one of diffy_1 through diffy_4 has an absolute value identical to that of the smallest one of diffy_1 through diffy_4. This condition corresponds to a border case that comes between a case in which the value of the pixel of interest should be increased and a case in which the value of the pixel of interest should be decreased. Because of this, no correction is made to the pixel of interest.

If one of the conditions (8) through (11) is not satisfied, diffy_max is identified as having the largest absolute value among diffy_1 through diffy_4, and the enhancement value generating unit 34 generates a correction value (enhancement value) as follows. The generated correction value is then added to (or rather "subtracted from" as a form of expression) each of the R, G, and B colors of the pixel of interest of the input signals.

$$R[x,y]=R[x,y]-R\text{gain}\times\text{diffy\_max}$$

$$G[x,y]=G[x,y]-G\text{gain}\times\text{diffy\_max}$$

$$B[x,y]=B[x,y]-B\text{ain}\times\text{diffy\_max}$$

Here, the second term on the right-hand side of each equation is the correction value (enhancement value). Rgain, Ggain, and Bgain are gain factors for defining the degree of contour enhancement with respect to R, G, and B, respectively. It suffices to have the gain factors that are more than zero, and the gain factors may be set to 0.8, for example.

In the variation of the second embodiment described above, a line-delay memory should be provided only for the Y component in the same manner as in the second embodiment, thereby achieving a relatively small circuit size. Further, contour enhancement using accurate luminance information is attained. In comparison with the second embodiment, the variation of the second embodiment can guarantee a relatively large correction value (enhancement value), thereby producing a sufficient contour enhancement effect.

Further, the present invention is not limited to these embodiments, but various variations and modifications may be made without departing from the scope of the present invention.

What is claimed is:

1. A semiconductor integrated circuit, comprising:
    a differential calculating unit which obtains a differential between a value of a pixel of interest and a value of an adjacent pixel with respect to each of four neighboring pixels contained in an image signal supplied from an image sensor;
    a dead-zone generating unit which defines a predetermined range of pixel values; and
    a comparison unit which checks whether the differential falls outside the predetermined range with respect to each of the four neighboring pixels,
    wherein contour enhancement is applied to the pixel of interest in response to a determination by the comparison unit that the differential falls outside the predetermined range with respect to at least one of the four neighboring pixels,
    wherein an enhancement value generating unit selects a differential having a largest absolute value among each said differential corresponding to the four neighboring pixels, and performs said contour enhancement in response to the differential having the largest absolute value,
    and wherein said contour enhancement is not performed if a largest differential among each said differential and a smallest differential among each said differential have opposite signs but have an identical absolute value regardless of whether the largest differential and the smallest differential fall outside the predetermined range.

2. The semiconductor integrated circuit as claimed in claim 1, wherein said enhancement value generating unit obtains an enhancement value based on differentials between the value of the pixel of interest and the values of the neighboring pixels, and said enhancement value generating unit adds the enhancement value to the value of the pixel of interest in response to the determination by the comparison unit that the differential falls outside the predetermined range.

3. The semiconductor integrated circuit as claimed in claim 1, wherein said differential calculating unit obtains the differential by using only a green-color component among a plurality of color components of the image signal.

4. The semiconductor integrated circuit as claimed in claim 1, wherein said differential calculating unit obtains the differential by using only a green-color component among a plurality of color components of the image signal, and said enhancement value generating unit obtains an enhancement value by using only the green-color component.

5. The semiconductor integrated circuit as claimed in claim 1, further comprising a luminance signal generating unit which obtains a luminance component from a plurality of color components of the image signal, and said differential calculating unit obtains the differential by using only the luminance component.

6. The semiconductor integrated circuit as claimed in claim 1, further comprising a luminance signal generating unit which obtains a luminance component from a plurality of color components of the image signal, wherein said differential calculating unit obtains the differential by using only the luminance component, and said enhancement value generating unit obtains an enhancement value by using only the luminance component.

7. A method of enhancing contours, comprising the steps of:
    obtaining a differential between a value of a pixel of interest and a value of an adjacent pixel with respect to each of four neighboring pixels contained in an image signal supplied from an image sensor;
    defining a predetermined range of pixel values;
    checking whether the differential falls outside the predetermined range with respect to each of the four neighboring pixels; and
    applying contour enhancement to the pixel of interest in response to a determination that the differential falls outside the predetermined range with respect to at least one of the four neighboring pixels, wherein a differential having a largest absolute value among each said differential corresponding to the four neighboring pixels is selected, and said contour enhancement is performed in response to the differential having the largest absolute value, and wherein said contour enhancement is not performed if a largest differential among each said differential and a smallest differential among each said differential have opposite signs but have an identical absolute value regardless of whether the largest differential and the smallest differential fall outside the predetermined range.

* * * * *